United States Patent [19]

Bramley

[11] Patent Number: 4,821,321

[45] Date of Patent: Apr. 11, 1989

[54] AUTOMATIC SECURE TRANSMISSION AND RECEPTION OF PICTORIAL INFORMATION

[75] Inventor: Jenny Bramley, Falls Church, Va.

[73] Assignee: The United States of America as represented by the Secretary of the Army, Washington, D.C.

[21] Appl. No.: 340,550

[22] Filed: Dec. 31, 1981

[51] Int. Cl.⁴ ............................................. H04N 7/167
[52] U.S. Cl. ..................................... 380/54; 235/471; 380/14; 380/18; 382/32; 382/66
[58] Field of Search ............... 358/114, 117, 118, 122, 358/123, 259, 119; 235/471; 382/32, 66; 380/54, 14, 18

[56] References Cited

U.S. PATENT DOCUMENTS

| | | | |
|---|---|---|---|
| 1,634,390 | 7/1927 | Zworykin | 358/118 |
| 2,405,252 | 8/1946 | Goldsmith | 358/259 |
| 2,807,728 | 9/1957 | Kilburn et al. | 235/471 |
| 2,940,005 | 6/1960 | Toulon | 358/119 |
| 3,261,911 | 7/1966 | Bailey et al. | 358/259 |
| 3,627,919 | 12/1971 | Roth et al. | 358/114 |
| 3,958,077 | 5/1976 | Ross et al. | 358/119 |
| 4,024,575 | 5/1977 | Harney et al. | 358/118 |
| 4,091,423 | 5/1978 | Branscome | 358/259 |
| 4,145,716 | 3/1979 | Uemura et al. | 358/118 |
| 4,337,483 | 6/1982 | Guillou | 358/114 |

FOREIGN PATENT DOCUMENTS 2067871  7/1981  United Kingdom ............... 358/119

Primary Examiner—Stephen C. Buczinski
Attorney, Agent, or Firm—Max L. Harwell; Milton W. Lee; Anthony T. Lane

[57] ABSTRACT

A real time coding system for the transmission and reception of pictorial two-dimensional information at television (TV) rates. In one coding system, the input signal and a coding signal are modulo added in an operational amplifier and are transmitted therefrom as a coded signal, which may be a coded video signal. In the receiver, an operational amplifier receives the coded video signal along with an exact replica of the coding signal. The coding signal is subtracted from the coded video signal wherein the resulting original input signal is produced and fed to a TV type display, such as a CRT or electroluminescent flat panel. In a second coding system, a coding pattern is comprised of a transparent matrix structure which is substituted for a time varying signal. A flying spot scanner receives a voltage input signal from an operational amplifier and is controlled by a selected code for selectively scanning the transparent coding pattern matrix. The coded input light signals derived from the coding pattern matrix are applied to a photomultiplier wherein the output therefrom is transmitted to a receiver as a coded signal. The receiver decodes the coded signal by passing through an operational amplifier to a flying spot scanner which has a decoding pattern matrix associated therewith for selectively scanning the decoding pattern matrix according to the same selected code controlled scan pattern. The decoded light signal from the flying spot scanner is applied to a photomultiplier and the output therefrom is fed to a TV type display.

10 Claims, 4 Drawing Sheets

| ROW\COLUMN | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A | 1 | 2 | 3 | 4 | 5 | 6 | 7 | 8 | 9 | 10 | 11 | 12 | 13 | 14 | 15 | 16 |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| G | | | | | | | | | | | | | | | | |
| H | | | | | | | | | | | | | | | | |
| I | | | | | | | | | | | | | | | | |
| J | | | | | | | | | | | | | | | | |
| K | | | | | | | | | | | | | | | | |
| L | | | | | | | | | | | | | | | | |
| M | | | | | | | | | | | | | | | | |
| N | 5 | 9 | 16 | 3 | 11 | 7 | 4 | 13 | 12 | 1 | 15 | 6 | 12 | 8 | 10 | 14 |
| O | | | | | | | | | | | | | | | | |
| P | | | | | | | | | | | | | | | | |
| Q | | | | | | | | | | | | | | | | |
| R | 3 | 11 | 2 | 5 | 16 | 7 | 14 | 1 | 9 | 10 | 4 | 6 | 12 | 15 | 8 | 13 |
| S | | | | | | | | | | | | | | | | |
| T | 6 | 12 | 8 | 9 | 10 | 15 | 5 | 16 | 4 | 3 | 7 | 1 | 11 | 14 | 13 | 2 |
| U | 7 | 4 | 10 | 15 | 2 | 5 | 8 | 1 | 3 | 6 | 13 | 9 | 14 | 11 | 16 | 12 |
| V | | | | | | | | | | | | | | | | |
| W | | | | | | | | | | | | | | | | |
| X | | | | | | | | | | | | | | | | |
| Y | | | | | | | | | | | | | | | | |
| Z | | | | | | | | | | | | | | | | |

FIG. 3

|   | COLUMN | | | | | | | | | | | | | | | |
|---|---|---|---|---|---|---|---|---|---|---|---|---|---|---|---|---|
| ROW | 1 | 2 | 3 | 4 | 5 | 6 | 7 | 8 | 9 | 10 | 11 | 12 | 13 | 14 | 15 | 16 |
| A | 1 | 2 | 3 | 4 | 5 | 6 | 7 | 8 | 9 | 10 | 11 | 12 | 13 | 14 | 15 | 16 |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| G | | | | | | | | | | | | | | | | |
| H | | | | | | | | | | | | | | | | |
| I | | | | | | | | | | | | | | | | |
| J | | | | | | | | | | | | | | | | |
| K | | | | | | | | | | | | | | | | |
| L | | | | | | | | | | | | | | | | |
| M | | | | | | | | | | | | | | | | |
| N | 10 | 9 | 4 | 7 | 1 | 12 | 6 | 14 | 2 | 15 | 5 | 13 | 8 | 16 | 11 | 3 |
| O | | | | | | | | | | | | | | | | |
| P | | | | | | | | | | | | | | | | |
| Q | | | | | | | | | | | | | | | | |
| R | 8 | 3 | 1 | 11 | 4 | 12 | 6 | 15 | 9 | 10 | 2 | 13 | 16 | 7 | 4 | 5 |
| S | | | | | | | | | | | | | | | | |
| T | 12 | 16 | 10 | 9 | 7 | 1 | 11 | 3 | 4 | 5 | 13 | 2 | 15 | 14 | 6 | 8 |
| U | 8 | 5 | 9 | 2 | 6 | 10 | 1 | 7 | 12 | 3 | 14 | 16 | 11 | 11 | 4 | 15 |
| V | | | | | | | | | | | | | | | | |
| W | | | | | | | | | | | | | | | | |
| X | | | | | | | | | | | | | | | | |
| Y | | | | | | | | | | | | | | | | |
| Z | | | | | | | | | | | | | | | | |

FIG. 4

AUTOMATIC SECURE TRANSMISSION AND RECEPTION OF PICTORIAL INFORMATION

The invention herein may be manufactured, used, and licensed by the U.S. Government of governmental purposes without the payment of any royalties thereon.

BACKGROUND OF THE INVENTION

1. Field of the Invention.

The present invention is in the field of a real time coding system for the automatic secure transmission, reception, and decoding of two-dimensional information at television (TV) rates.

2. Description of the Prior Art.

In some prior art methods of secure transmission TV images, the picture portion of such scan line of the TV image is randomly rotated wherein each scan line is digitized and the resulting digital numbers are sequentially stored in a random access digital memory for reading data corresponding to the line syncronization signal and the stored picture data beginning with an address which is randomly selected.

SUMMARY OF THE INVENTION

The present invention is a television (TV) type system having capability of automatic coding, transmission to some distant location for display, and decoding of secure narrow band transmission of two-dimensional information, e.g. pictorial information such as maps, photographs, live images, or facsimile text, in which the system operates in real time, i.e. at 30 frames per second using conventional TV bandwidths. The information is in the form of two dimensional intensity distribution. In each of the coding schemes, a procedure is established whereby each intensity value of the input is replaced by a different one specified by a coding scheme.

Two systems of implementation of the coding schemes are included in this application. One system, the addition coding method, is based on the principle of modulo addition wherein the code is presented in a series of frames of the same format as the two-dimensional input information but is constructed in accordance with security standards. The technique of modulo addition operates whereby a different frame of code is added, point-by-point, to every frame of input information. In the substitution coding method, the physical embodiment of the code is comprised of a single transparency coding pattern matrix combined with a code that directs the electron beam of a flying spot scanner to a specified scan line in synchronization with the video input. In either of the methods, the probability of reconstructing the coding procedure without knowledge of the code is so small that the decoding of an intercepted set of signals is practically an insurmountable task.

The physical embodiment of the code will be called the coding pattern. The important factor which preserves the secrecy of the coding is the absence of one-to-one correspondence between the actual intensity and its coded value.

BRIEF DESCRIPTION OF THE DRAWINGS

FIG. 3 shows one example of a coding pattern; and

FIG. 4 illustrates a decoding pattern directly associated with the coding pattern of FIG. 3.

DETAILED DESCRIPTION OF THE PREFERRED EMBODIMENTS

Figure 1:
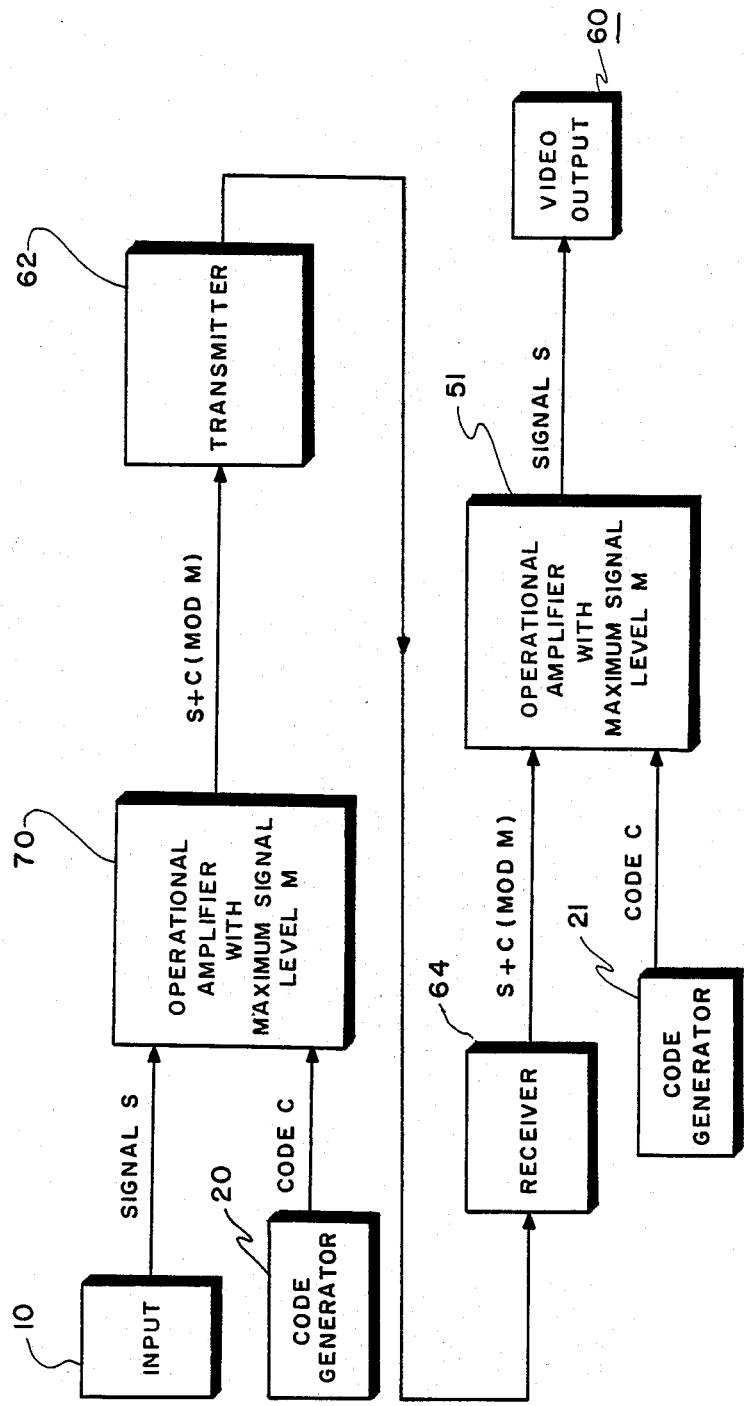
FIG. 1 illustrates in block diagram schematic the mode of operation system for the addition coding method.

Referring to FIG. 1, a video input mechanism 10 provides information signals in accordance with standard TV practice; i.e. in successive frames numbered 1, 2, ... i, ... etc, is connected as one input to an operational amplifier 70.

Let $S_n^{(i)}$ denote the continuously time-varying information signal which constitutes line n of $S^{(i)}$ and $C_n^{(i)}$ denote the corresponding signal of $C^{(i)}$; i.e. one that represents line n, and let M, a preassigned value, be a maximum signal level inside operational amplifier 70. The code C is set up so that its maximum signal level will reach but not exceed M, while the input information signal S must always be smaller than M. This requirement is essential to preclude possible ambiguity on decoding. The limitation on S can be accomplished by attenuation, which amounts to toning down the extreme highs in a picture.

Coding consists in replacing $S_n^{(i)}$ by $R_n^{(i)}$, which is the sum of $S_n^{(i)}$ and $C_n^{(i)}$ carried out modulo M. This type of addition is essential since in straight addition the sum may exceed the maxiumum value M acceptable for the signal. Hence, $$\text{if } S_n^{(i)}+C_n^{(i)}<M, R_n^{(i)}=S_n^{(i)}+C_n^{(i)}, \text{ and if}$$
$$S_n^{(i)}+C_n^{(i)}\geq M, R_n^{(i)}=S_n^{(i)}+C_n^{(i)}-M.$$

Essentially, the procedure consists of an amplitude modulation of the original signal by the coding pattern, a limit being placed on the maximum modulation permitted. The process is repeated for every vaue of n, starting with n=1 and ending the n=N, corresponding to the last line of the input. A duplicate of coding pattern C is provided by code generator 21 for decoding at the receiver. Coding pattern C is preferably recorded on video tape in both 20 and 21 and consists of the same number of lines as video input 10. Since the coding was carried out modulo M, the decoding has to proceed similarly. If $C_n^{(i)} \leq R_n^{(i)}$, it is subtracted directly from $R_n^{(i)}$ to reproduce the original signal $S_n^{(i)}$. If $C_n^{(i)} > R_n^{(i)}$, then M must be added to $R_n^{(i)}$ before the subtraction is performed.

Any standard format of input information 10 may be used; e.g. a photographic film, a printed map or facsimile text, a video tape recording, or a live image. When viewed by an appropriate device, these will all produce the input signals. The coding pattern C is most conveniently stored on video tape. Appropriate devices for viewing the input information may be convential TV cameras of which many varieties are known and available. To carry out the signal addition, $S_n^{(i)}$ and $C_n^{(i)}$ are fed simultaneouly into linear operational amplifier 70 where the resultant signals S+C is formed and compared with the maximum signal level M. Conventional synchronization methods are used. The coded signal S+C (mod M) is transmitted by transmitter 62 to a remotely located receiver 64. In the receiver portion of the system, a linear operational amplifier 51 is also used. The received signal $R_n^{(i)}$ is fed into amplifier 51, and the coding signal $C_n^{(i)}$ is subtracted from $R_n^{(i)}$ modulo M, as explained herein below. This operation corresponds to a modulation of the same magnitude but of opposite polarity to that performed at the transmitter. The result can be achieved in a number of ways. For example, negative of $C_n^{(i)}$ can be added to $R_n^{(i)}$. With adequate linear operational amplifiers that are readily obtainable commercially, the result should, for all practical purposes, be indistinguishable from $S_n^{(i)}$. The resultant signal S is fed into a video output 60, which may be any conventional TV type display available to the user such as a cathode ray tube (CRT) or any flat panel such as plasma or electroluminescence panel now in existence or later developed where signal S is displayed. Synchronization between $R_n^{(i)}$ and $C_n^{(i)}$ is extremely critical at the receiver end. It may prove necessary to record the incoming set of signals $R_n$ on a second video tape and then to synchronize the two tape recordings, which is a much easier procedure than synchronizing a tape with incoming signals.

Consider the security of transmission of a picture repeated only a few times; i.e. the case where there is no question of possible code integration, which is analogous to noise integration. Since the coding signal $C_n^{(i)}$ varies from line to line and from frame to frame, it appears to be practically impossible to reconstruct the set of information signals $S_n^{(i)}$ from the set of coded signals $R_n^{(i)}$. The original picture may, for example, consist of $16 \times 16$ resolution elements. For purposes of simulation, the intensity at each point is quantized to one out of a possible ten values numbered from 0 to 9. The original represents a well-defined high-contrast pattern containing several spatial frequencies. Thus in this simulation, the continuous signal $S_n$ from line n is replaced by 16 discrete values, numbered $S_{n1}, S_{n2}, \ldots, S_{n16}$. Since only one frame is being considered, the superscript is omitted. A similar arrangement of $16 \times 16$ numbers is used for the coding pattern C. A random distribution of numbers from 0 to 9 is obtained by listing successively the last digits in a column of numbers in the telephone book. The next to the last digit, or the one before it, are used whenever this is necessary to avoid repetition of the same number at ajoining locations. Since not two frames of code are alike, availability of more data would not simplify the decoding problem.

The question has been raised whether or not for a repetitivve presentation, where part of the information is stationary; i.e. repeated without change from frame to frame, there is a possibility of the code being integrated out. If this were the case, then the display of moving targets against a stationary background, the latter could be recovered by an interceptor.

Let s denote the instantaneous value of the information signal, $c(i)$ the corresponding instantaneous value of the code pattern in frame i, and $r(i)$ the addition of the two, modulo M. We want to find $\bar{r}$, the average value of $r(i)$, when the total number z of transmissions is large; i.e.

$$\bar{r} = \frac{1}{z} \sum_1^z r(i),$$

Note with regard to the values of z, that $z \sim 900$ corresponds to a TV presentation of the order of 30 seconds at the conventional rate of 30 frames per second.

Since the code value $c(i)$ are assumed to be equally probable and randomly distributed in the range of $0 < c(i) < M$, the probability of $a_1 < c8i) < a_2$ is $(a_2 - a_1)M$. In view of the modulo M addition, the expressions for $r(i)$ differ depending on whether $$s + c(i) > < M.$$

We shall consider the two cases separately. In the first case, let $M - s < c(i) < M$, the probability of this occurrence is $s/M$. Then $r(i) = s + c(i) - M$ and $$\bar{r} = S + \frac{1}{z} \sum_1^z c(i) - M$$

The most probable value for the summation is its average value over the range, i.e. $M - \frac{1}{2}s$. Hence, $$\bar{r} = \tfrac{1}{2}s, \qquad (1)$$

the probability of this value occurring being $(s/M)^z$.

Consider now the second range, $0 < c(i) < M - s$, for which the probability is $(M-s)/M$. Here $r(i) = s + c(i)$ and $$\bar{r} = S + \frac{1}{z} \sum_1^z c(i)$$

The most probable value for the summation in this case is $\tfrac{1}{2}(M-s)$, so that $$\bar{r} = \tfrac{1}{2}(M+s) \qquad (2)$$

with a probability $(1 - s/M)^z$.

The value of $\bar{r}$ given by Equation (1) is obviously the most probable one if $s > \tfrac{1}{2}M$, and that given by Equation (2) is $s < \tfrac{1}{2}M$. However, since even the greater value of the probability is very small, one would expect $\bar{r}$ to lie somewhere between these limits.

Hence, there is no "code integration." Thus, since every conventional TV frame consists of $525 \times 525$ resolution points or instantaneous signals, the probability of an interceptor being able to determine the correct sequence of signals is vanishingly small even for a highly repetitive transmission.

Figure 2:
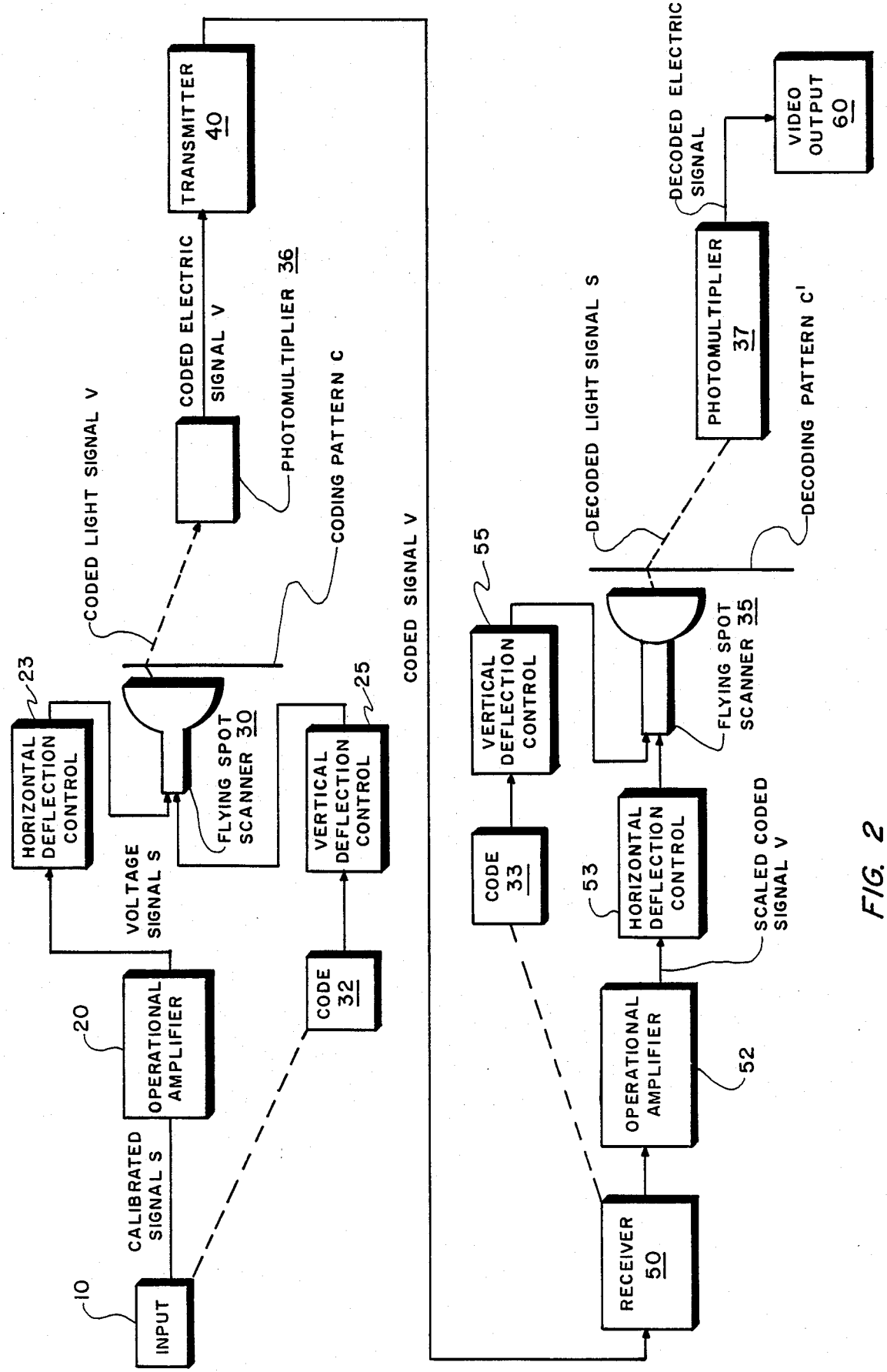
FIG. 2 illustrates the block diagram schematic for the substitution coding method.

Refer now to FIG. 2 for an explanation of the substitution coding method. While the addition coding method requires an actual physical change of code for every single frame of presentation, the substitution scheme makes use of a single coding pattern C, and an associated decoding pattern C'. The changes, and thus the complete security of transmission, are introduced by a code, represented by numeral 32.

The coding pattern C has a matrix structure. Let the matrix consist of 16 columns and a multiplicity of rows; e.g. 26 in number. The entry at each matrix location is in area of specified size at a uniformm intensity level, which may have one of 16 values ranging from white to black. The reasons for using 16 gray levels is presented herein below. No two areas in the same row may have the same intensity, and numbers from 1 to 16 are assigned to these intensity levels. The columns specifying the locations of the intensity areas are labelled sequentially from 1 to 16. The top row is an intensity wedge; i.e. the intensities are arranged sequentially. Thus, in this row the column number coincides with the number denoting the intensity level. The other rows contain various permutations of these 16 gray levels. With $16' = 2 \cdot 10^{13}$ permutations possible, there is for all practical purposes a limitless number of different coding patterns that may be formed.

A transposed intensity matrix C', in the receiver portion, is obtained by interchanging in each row of pattern C the number specifying the location of an area with the number specifying the intensity of that area. This transposed intensity matrix C is used as a decoding pattern. It should be noted that this differs from the term transposed matrix used in mathematics. FIG. 3 shows a possible implementation of the above coding pattern C wherein the rows are labelled according to the letters of the alphabet, thus the reason for the number 26. More rows and a different labelling arrangement may, however, be readily used. FIG. 4 shows the corresponding decoding pattern C'. Only some of the rows are marked for simplicity of explanation.

The coding notation used in the substitution coding method is analogous to that for the addition coding method. To emphasize the different method used in obtaining the coded video information signal, the symbol V, rather the symbol R, is used in designation. The first subscript refers to the number of the TV line and the second one to the position of the resolution point on the line. As far as the coding and decoding patterns C and C' are concerned, the first subscript refers to the matrix row number and the second one to the column number. To avoid any possible confusion, Greek letters are used as subscripts in this case since the rows of C and C' are labelled according to the letters of the alphabet.

In the substitution coding method, or scheme, the continuously time-varying signal $S_j$ from any line j (J=1,2, ..., N) of the information to be coded must be divided into N equally spaced portions $S_{j1}, S_{j2}, \ldots, S_{jN}$ corresponding to the N resolution points per line. As long as the discussion is confined to a single frame, the superscript is omitted. The coding starts with the signal $S_{11}$ at the first resolution point on line 1 of the presentation to be coded. Let this signal be closest in intensity value to some level numbered $\gamma$. Therefore, on row a of C this level is in column $\gamma$. The coded value $V_{11}$ is the intensity in column $\gamma$ in a row of the coding pattern selected as follows.

The row choice is specified by a sequence of letters set up in accordance with security standards. In the examples presented below, these standards are now followed. We simply assume that the first six letters specifying the choice of row are n, a, t, u, r, e. Hence we look for $V_{11}$ on line n, $V_{12}$ on line a, for $V_{13}$ on line t, etc.

The coding operation $S_{11} \rightarrow V_{11}$ is, therefore, symbolized by the entries in the arrangement as shown below.

| Signal | $S_{11}$ | $V_{11}$ |
|---|---|---|
| Column number | $\gamma$ | $\gamma$ |
| Intensity level | $\gamma$ | Level number in row n and column $\gamma$ of matrix C, designated by $\eta$. ($\eta$ = column number of level $\gamma$ in row n of matrix C'.) |

An example of coding picture signals using the coding pattern C of FIG. 3 are as shown. Let the first five intensity values of the presentation be coded be 3 1 4 1 5. The coded values are obtained from the arrangement below.

| | |
|---|---|
| The number in column 3 on row n is | 16 |
| The number in column 1 on row a is | 1 |
| The number in column 4 on row t is | 9 |
| The number in column 1 on row u is | 7 |

-continued

| | |
|---|---|
| The number in column 5 on row r is | 16 |

Thus the coded value of 3 1 4 1 5 is 16 1 9 7 16.

The inverse set of operations is carried out to perform a decoding. Since sequencing of rows is crucial in this scheme, we must be certain that we start decoding with the first signal of a frame and the decoding is synchronized with the coding. Let the first coded light signal $V_{11}$ be closest to the level $\eta$. If no decoding pattern C' were available, it would be necessary first to find the location $\gamma$ of this level on row n of the coding pattern C. This calls for a matching process, which is somewhat laborious. The procedure is greatly simplified by recourse to the decoding pattern C'. Using the second definition of $\eta$ above, we need merely to ascertain the value $\gamma$ of the level at location $\eta$ on row n of C'. Since the second letter of the coding sentence is a, the coded and uncoded intensities are the same for the second signal. The procedure with the third signal is the same as for the first one, except that we use row t of C'. The process is kept up until the whole frame is decoded.

An example of decoding topographic information signal using decoding pattern C' is shown in FIG. 4. Let the first five coded signals be 11 1 12 2 13. The decoded values are obtained from the arrangement shown here.

| | |
|---|---|
| In column 11 of row n the intensity level is | 5 |
| In column 1 of row a the intensity level is | 1 |
| In column 12 of row t the intensity level is | 2 |
| In column 2 of row u the intensity level is | 5 |
| In column 13 of row r the intensity level is | 16 |

The matrix arrangement for the coding pattern C uses a flying spot scanner 30 for scanning the rows and columns thereof. The coding pattern is most conveniently a transparency, though this restriction is not essential. As described above, the first step in coding is to find the location of the intensity of the input information signal in the intensity wedge of row a. This requires, of course, that the level value be known precisely. Therefore, the amplifiers in the electronics must be calibrated so that a signal of intensity $\gamma$ matches the signal obtained from the area of the intensity wedge, in row a, when a flying spot scanner is used. Throughout this disclosure, $\gamma$ can assume any value from 1 to 16. Once this first calibration has been carried out, a linear operational amplifier 20 is calibrated to transform the intensity signal $\gamma$ to a voltage $\gamma$ which when applied to the horizontal deflection system of the flying spot scanner 30 will position the electron beam facing the center of column $\gamma$ of the coding pattern.

Let the input information signal 5 to be coded be the closest in intensity to the level $\gamma$. After it is passed through the operational amplifier 20, the resulting horizontal deflection voltage will position the electron beam within an area which faces column $\gamma$. Since the column has finite width, any deflection voltage which positions the electron beam within that range will give rise to quantization of the information signal. The vertical deflection voltage is programmed by means of code 32 to scan rows n, a, t, etc. in succession. Thus the flying spot scanner 30 is directed sequentially to the locations of the coded signals $V_{11}, V_{12}, V_{13}$, etc. The subsequent procedure is the same as used conventionally in TV for a signal obtained by scanning a transparency with a flying spot scanner; i.e. a photomultiplier 36 is used to transform the light intensity of coded light signal V into an electric signal, which is then suitably amplified and transmitted from transmitter 40 to receiver 50.

The decoding operation in the receiver portion must be analogous to the coding one, with the coding pattern C replaced by the decoding pattern C'. Calibration is needed to take care of signal attenuation during transmission. This can be established, for example, by transmitting at specified times the complete intensity wedge uncoded. Let the first coded signal $V_{11}$ in any frame have an intensity $\eta$ before it is transmitted. The attenuated signal received is passed through the calibrated linear operational amplifier 52. The output voltage $\eta'$ of amplifier 52 is such that when applied to the horizontal deflection system of the flying spot scanner 35, it positions the electron beam facing column $\eta$ of the decoding pattern C'. At the same time, the vertical deflection system controlled by code 33, which is synchronized with code 32 directs the beam to face row n of C'. Thus as explained previously, the flying spot scanner 35 is directed to the location of the level $\gamma$ of the decoded signal. This is the value of the original information signal $S_{11}$. The process is repeated for all succeeding incoming coded signals, the vertical deflection system being programmed in codes 32 and 33 to direct the electron beam successively along rows n, a, t, etc. The subsequent procedure again is the same as used conventionally in TV when the signal is in the form of a light beam.

In reducing the substitution coding method to practice, the major consideration is how to minimize the possibility of error. This impose stringent requirements on synchronization to insure that the start of every frame is known precisely. On the first models of the system, it may therefore be advisable to record the coded signals coming into the receiver 50 on video tape at the same time that they are being decoded. This will permit checking back if necessary. Another important consideration is the noise that may be added to the coded signal during transmission. If the noise is such that the coded signal is changed by one level of intensity, the signal value obtained after decoding would bear no relation to the original. The probability of level shift due to noise should be practically eliminated by restricting the number of gray levels to 16.

The registry problem in the flying spot scanners are completely eliminated since 525×525 resolution points are available with a conventional CRT display while the coding and decoding patterns call only for an array of 16×26. Even quadrupling the number of rows will not introduce any problems. When the state-of-the-art advances with regard to reliable TV components, it should be possible to increase the number of picture elements from the 525×525 used in conventional TV to, say, 1000×1000. It should also be practical to increase the number of gray levels from 16 to 32 without increasing the probability of error.

I claim:

1. A technique of real time secure coding for transmission and reception of pictorial two-dimensional information at television rates, comprising the steps of;

providing pictorial input information signal in the form of two-dimensional intensity distribution signals and limiting the maximum signal level of said input information signal to some predetermined maximum allowable signal level by toning down any extreme high contrast intensity values to fall below said maximum signal level;

simultaneously coding said input information distribution singals by use of a synchronized coding scheme in the transmission and reception portions wherein each intensity value of said input information distribution signals is replaced by a different value specified by said coding scheme in said transmission portion and is returned to the original intensity value in said reception portion, wherein said coding step by use of a synchronized coding scheme is comprised of supplying a coding signal having the same continuously time-varying characteristic as said input information signal and is selected such that said maximum signal level of said coding signal will reach but not exceed said predetermined maximum allowable signal level and simultaneously feeding said input information signal and said coding signal into a linear operational amplifier for forming a resultant coded signal having each intensity value of said input information signal replaced by a different value specified by said coding signal in accordance with a predetermined code pattern and comparing said resultant coded signal with said predetermined maximum allowable signal level; and providing a secure display of said input information distribution signals at said reception portion.

2. The technique as set forth in claim 1 wherein the step of forming the resultant coded signal utilizes a coded signal formed in accordance with a coding pattern wherein matching portions of said coding pattern are correspondingly associated with portions of said two-dimensional intensity distribution signals of said two-dimensional information and are modulo added in said operational amplifier to produce said coded information signal in which said predetermined maximum signal level within said operational amplifier is never exceeded by said input information signal and the intensity of said coding pattern will reach but not exceed said predetermined maximum signal level on a point-by-point basis of each incremental element.

3. The technique of claim 2 further including the step of: transmitting, at conventional television rates, said resultant coded signal to some distance location; and equipping a receiver to receive and decode said resultant of coded signal on a real-time basis.

4. The technique as set forth in claim 3 wherein the step of decoding comprises the steps of reversing the coding procedure.

5. The technique as set forth in claim 3 wherein the step of decoding said resultant coded information signal is accomplished by utilizing a decoding pattern that is a duplicate of said coding pattern and which is modulo subtracted from said two-dimensional intensity distribution of said two-dimensional information in another operational amplifier.

6. The technique as set forth in claim 1 wherein the step of coding said input information distribution includes the step of:

providing a single transparency coding pattern matrix combined with a first code that is synchronized with said input information signal and a scanning means that scans said single transparency coding pattern matrix to produce a coded light signal wherein said scanning means receives a scaled input signal of the original input information signal operated on by an operational amplifier wherein the horizontal deflection voltage of said scanning means is synchronized with the horizontal deflection voltage from said operational amplifier and the vertical deflectin voltage of said scanning means is controlled by said first code in which said coded light signal is converted to a coded electrical signal.

7. The technique as set forth in claim 6 wherein the coded electrical signal is transmitted to some distant location and received by receiving means capable of decoding said coded signal.

8. The technique as set forth in claim 6, wherein the step of decoding comprises the steps of reversing the coding procedure.

9. The technique as set forth in claim 7 whereinthe step of decoding further includes the steps of:

providing a transposed intensity matrix associated with said single transparency coding pattern matrix wherein said transposed intensity matrix is combined with a second code which is synchronized with said first code and said coded electrical signal received in said step of receiving said coded information signal and a second scanning means that scans said transposed intensity matrix to produce a decoded light signal from a scaled coded signal of said coded electrical signal operated on and received from a operational amplifier in the receiver at the input to said second scanning means wherein the horizontal deflection voltage of said second scanning means is synchronized with the horizontal deflection voltage from said operational amplifier in the reciever and the vertical deflection voltage of said second scanning means is controlled by said second code in which said decoded light signal is converted to a decoded electrical signal by said converting means.

10. A technique as set forth in claim 7 wherein said single transparency coding pattern matrix has a matrix structure of a plurality of rows and columns wherein each matrix location is an area of specific size and at a uniform intensity level which has one of a number n of values ranging from white to black in which no two areas in the same row have the same intensity and have numbers 1 through n assigned to these intensity levels in each row wherein the first row across said plurality of columns is comprised of an intensity wedge of 1 through n and wherein said transposed intensity matrix is obtained by interchanging in each row of said single transparency coding pattern matrix a number specifying the location of an area with the number specifying the intensity of that area wherein the first step of coding is to find the location of the intensity of the video input information signal in said intensity wedge that corresponds to the intensity of said video input information signal and further wherein said first linear operational amplifier is calibrated to transform the intensity of said input information signal to a voltage level that is applied to the horizontal deflection of said first flying spot scanner to position the electron beam therein to face the center of the column of said single transparency coding pattern matrix consistent with the intensity of said input information signal and said intensity wedge.

* * * * *